(12) United States Patent
Avrutsky et al.

(10) Patent No.: US 8,853,886 B2
(45) Date of Patent: Oct. 7, 2014

(54) SYSTEM FOR USE OF STATIC INVERTERS IN VARIABLE ENERGY GENERATION ENVIRONMENTS

(75) Inventors: Mordechay Avrutsky, Alfei Menashe (IL); Dan Kikinis, Saratoga, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 562 days.

(21) Appl. No.: 13/149,163

(22) Filed: May 31, 2011

(65) Prior Publication Data

US 2011/0304215 A1    Dec. 15, 2011

Related U.S. Application Data

(60) Provisional application No. 61/397,320, filed on Jun. 9, 2010.

(51) Int. Cl.
*H02J 1/00*    (2006.01)

(52) U.S. Cl.
USPC .......................................................... 307/63

(58) Field of Classification Search
USPC .......................................................... 307/63
See application file for complete search history.

(56) References Cited

U.S. PATENT DOCUMENTS

| | | | |
|---|---|---|---|
| 4,384,321 A | 5/1983 | Rippel | |
| 5,155,670 A | 10/1992 | Brian | |
| 5,235,266 A | 8/1993 | Schaffrin | |
| 5,268,832 A | 12/1993 | Kandatsu | |
| 5,604,430 A | 2/1997 | Decker et al. | |
| 5,923,158 A | 7/1999 | Kurokami et al. | |
| 6,275,016 B1 | 8/2001 | Ivanov | |
| 6,448,489 B2 | 9/2002 | Kimura et al. | |
| 6,650,031 B1 | 11/2003 | Goldack | |
| 6,844,739 B2 | 1/2005 | Kasai et al. | |
| 6,894,911 B2 | 5/2005 | Telefus et al. | |
| 6,984,970 B2 | 1/2006 | Capel | |
| 7,061,214 B2 | 6/2006 | Mayega | |

(Continued)

FOREIGN PATENT DOCUMENTS

| AU | 2005262278 | 7/2005 |
|---|---|---|
| DE | 4232356 | 3/1994 |

(Continued)

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

(Continued)

*Primary Examiner* — Robert L. Deberadinis
(74) *Attorney, Agent, or Firm* — Greenberg Traurig LLP (57) ABSTRACT

A system to collect energy from generation systems such as, for example, wind farms or solar farms with widely distributed energy-generation equipment. In some cases, static inverters are used to feed the energy directly into the power grid. In some other cases, back-to-back static inverters are used create a high-voltage DC transmission line to collect power from multiple generation sites into one feed-in site.

20 Claims, 9 Drawing Sheets

(56) References Cited

U.S. PATENT DOCUMENTS

| | | | |
|---|---|---|---|
| 7,248,946 | B2 | 7/2007 | Bashaw et al. |
| 7,256,566 | B2 | 8/2007 | Bhavaraju et al. |
| 7,276,886 | B2 | 10/2007 | Kinder |
| 7,518,346 | B2 | 4/2009 | Prexl |
| 7,595,616 | B2 | 9/2009 | Prexl |
| 7,605,498 | B2 | 10/2009 | Ledenev et al. |
| 7,609,049 | B1 | 10/2009 | Tian et al. |
| 7,719,140 | B2 | 5/2010 | Ledenev et al. |
| 8,212,408 | B2 * | 7/2012 | Fishman .................. 307/77 |
| 2002/0109585 | A1 | 8/2002 | Sanderson |
| 2003/0085621 | A1 | 5/2003 | Potega |
| 2005/0057214 | A1 | 3/2005 | Matan |
| 2005/0057215 | A1 | 3/2005 | Matan |
| 2006/0001406 | A1 | 1/2006 | Matan |
| 2006/0174939 | A1 | 8/2006 | Matan |
| 2006/0185727 | A1 | 8/2006 | Matan |
| 2007/0059986 | A1 | 3/2007 | Rockwell |
| 2007/0228838 | A1 | 10/2007 | Delmerico et al. |
| 2007/0273351 | A1 | 11/2007 | Matan |
| 2008/0106241 | A1 | 5/2008 | Deaver et al. |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0172312 | A1 | 7/2008 | Synesiou et al. |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0224629 | A1 | 9/2008 | Melanson |
| 2008/0303503 | A1 | 12/2008 | Wolfs |
| 2009/0096211 | A1 | 4/2009 | Stiesdal |
| 2009/0112493 | A1 | 4/2009 | Abdennadher et al. |
| 2009/0128102 | A1 | 5/2009 | Thorvaldsson |
| 2009/0189456 | A1 | 7/2009 | Skutt |
| 2009/0283129 | A1 | 11/2009 | Foss |
| 2010/0327657 | A1 | 12/2010 | Kuran |
| 2010/0332047 | A1 | 12/2010 | Arditi |
| 2011/0304204 | A1 | 12/2011 | Avrutsky et al. |
| 2011/0304213 | A1 | 12/2011 | Avrutsky et al. |
| 2013/0094262 | A1 | 4/2013 | Avrutsky |

FOREIGN PATENT DOCUMENTS

| | | |
|---|---|---|
| DE | 19961705 | 7/2001 |
| EP | 169673 | 1/1986 |
| EP | 1388774 | 2/2004 |
| ES | 2249147 | 3/2006 |
| WO | 03012569 | 2/2003 |

OTHER PUBLICATIONS

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Roman, Eduardo, et al., "Intelligent PV Module for Grid-Connectred PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

International Patent Application No. PCT/US2010/029929, International Search Report and Written Opinion, Oct. 27, 2010.

* cited by examiner

Figure 1

The Six-Phase Star Circuit

SYSTEM FOR USE OF STATIC INVERTERS IN VARIABLE ENERGY GENERATION ENVIRONMENTS

RELATED APPLICATION

The present application is a non-provisional application which claims the benefit of U.S. Provisional Patent Application Ser. No. 61/397,320 entitled "System and Method for Use of Static Inverters in Variable Energy Generation Environments" filed Jun. 9, 2010, which is hereby incorporated by reference in its entirety.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF INVENTION

Embodiments of this invention include collecting energy from variable energy generation systems for transmission.

BACKGROUND

In variable energy generation systems, such as wind, solar, and other opportunistic power generation systems, the amount of available energy at any given time is not known. Also, these systems are often physically distributed over a large area, thus creating a challenge for collecting the energy with minimum power losses.

BRIEF SUMMARY OF THE INVENTION

Embodiments of this invention include a system to collect energy from generation systems such as, for example, wind farms or solar farms with widely distributed energy-generation equipment. In some cases, static inverters are used to feed the energy directly into the power grid. In other cases, back-to-back static inverters are used to create a high-voltage DC transmission line to collect power from multiple generation sites into one feed-in site.

These and other objects of the present invention will become clear to those skilled in the art in view of the description of the best presently known mode of carrying out the invention and the industrial applicability of the preferred embodiment as described herein and as illustrated in the figures of the drawings. The embodiments are illustrated by way of example and not limitation.

BRIEF DESCRIPTION OF THE DRAWINGS

The purposes of the present invention will be apparent from the following detailed description in conjunction with the appended figures of drawings, in which.

In the various figures of the drawings, like references are used to denote like or similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein are merely provided for ease of reference, and shall not be interpreted in any way to limit this disclosure or the following claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
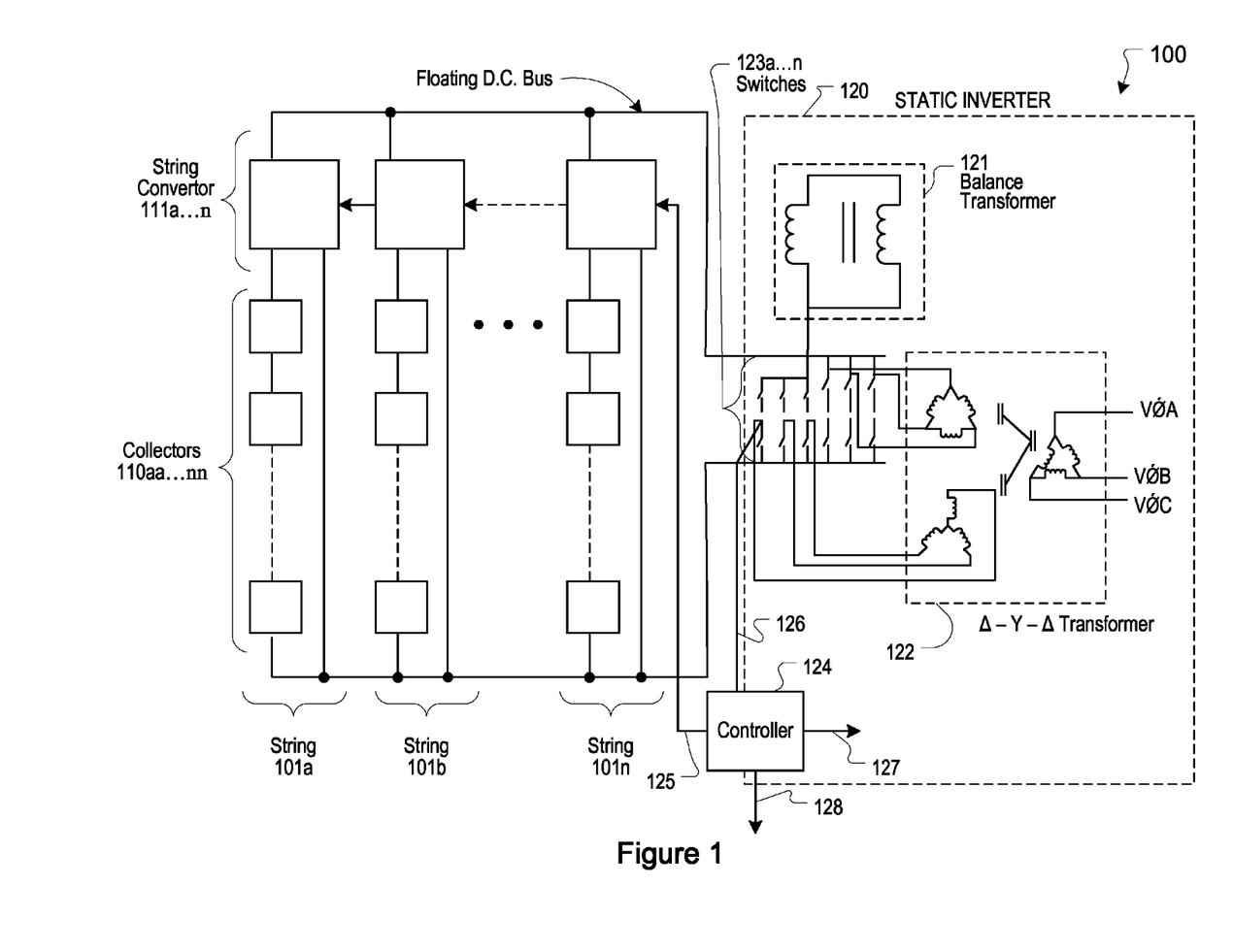
FIG. 1 shows an embodiment of the present invention of a variable energy generation system with a static inverter.

FIG. 1 shows an overview of an exemplary multi-point power generation system 100, according to one aspect of the system disclosed herein. Shown are string sets 101a . . . n, each equipped with a set of energy collecting units ("collectors") 110aa . . . nn which output direct current (DC). At the end of each string is a string converter 111a . . . n that feeds high-voltage into a floating DC bus, typically, for example, in a range between 100 volts and 1000 volts. Some regulatory bodies place limits on the voltages, such as between 50 and 600 volts, in some cases as high as 1000 volts, but for purposes of this discussion, the actual values of these local regulatory limits are not important.

One of the negative aspects of using a static inverter is that the input voltage is transformed at a given ratio into the output voltage. Thus, an input voltage set at, for example, 500 volts, results in a specific AC power at a certain voltage. To feed properly into the grid, the voltage and the phase is adjusted. The phase is easily adjusted by controlling the timing of the switches used in the static inverter. However, in normal operation, the voltage is not easily adjustable. In the exemplary system 100 of FIG. 1, the string converters 111*a* . . . *n* are used to move the floating DC bus up or down according to the current energy production, so that static inverter 120 with its fixed ratio can generate the correct voltage to feed into the grid.

Static inverters have several properties that can be used for advantage, although in many situations, they also can be problematic. One of the advantages is that switching losses are substantially lower, as frequencies are much lower, generally (range of 50-400 Hz typically). The disadvantage is that transformers can be larger. In the case of solar installations the transformer is typically required for system sizes above a power rating of about 20 kW (as per today's pending regulations, but a limit will likely be in most cases) as a result of the need to have a galvanic isolation between the grid and the DC bus. A transformer is required because solar panels have leakage current at normal operating conditions, as do, in some cases, inverters. The larger the system, the larger and potentially more dangerous are such leakages.

Further, standard Pulse Width Modulation (PWM) inverters typically have additional filtering to avoid heating the transformer at the switching frequency, because such inverters are less efficient when driving a transformer directly. These losses are in addition to their switching losses. They can be operated both ways, as converters and as rectifiers (hence inverter), and finally, they have a built-in ratio between input and output voltage that cannot be easily changed. The last point is often a problem, but in the examples discussed herein, that problem is not very critical, as the DC voltage bus can be adjusted by primary inverters to provide the desired or needed voltage to feed into the grid. Lastly, when used to feed into the grid, they have a power factor of typically 0.97 or even higher if a system with more than 12 pulses is used, but that factor can be adjusted as described below.

The aforementioned generation of the correct voltage is done with the help of controller 124, which has connections 125 to the string converters, setting the voltage outputs they need to generate. Further, controller 124 controls switches 123*a* . . . *n* with appropriately insulated drivers (typically driver transformers or optically coupled switches, or both, or other suitable solutions) through control line 126 (drivers not shown). Said line 126 is shown here simplified as one line, whereas in reality, line 126 would contain at least a separate control line or pair for each switch, and each line would have a potential separator. Additionally, connection 127 connects to the grid to measure the voltage phase, to ensure that the voltage feed is correct. Also shown is data connection 128, which connection could connect via the Internet or some other public or private network to the electric utility, sending real-time data about energy being delivered, as well as to a supervisory site that could control multiple power generation sites.

Table 1, below, shows some aspects of a standard PWM inverter for solar application as compared to the new proposed system using a static inverter solution.

TABLE 1

| Parameter | Standard solution with PWM inverter | New proposed system using static inverter |
|---|---|---|
| Line transformer need | Mandatory above 20 kw | Mandatory above 20 kw, but likely always using a transformer |
| DC bus losses | At full rated load DC bus voltage is | DC bus voltage is at its maximum level at full rated load yielding lower conduction losses by 44% |

TABLE 1-continued

| Parameter | Standard solution with PWM inverter | New proposed system using static inverter |
|---|---|---|
| | minimal yielding maximum losses at this point | (out of the typical 1.3% of conduction losses |
| Reliability | Components switched at relatively high frequency | Low switching frequency. Inverter efficiency higher by more than 1% resulting in lower operation temperature. Aluminum electrolytic not required. |
| EMI | Mainly affected by switching frequency | Low frequency component only |
| Local MPPT for maximum energy harvesting | None | Full solution solving all mismatch conditions as result of thermal, aging, soiling initial tolerances, shade. |
| Price for local MPPT | Need separate AC inverter per each power segment | Local MPPT by simple stage and simple DC-AC inverter lowest price possible |
| Cooling | Need separate fans | Transformer and switches can operate with natural convection cooling. |

Figure 2:
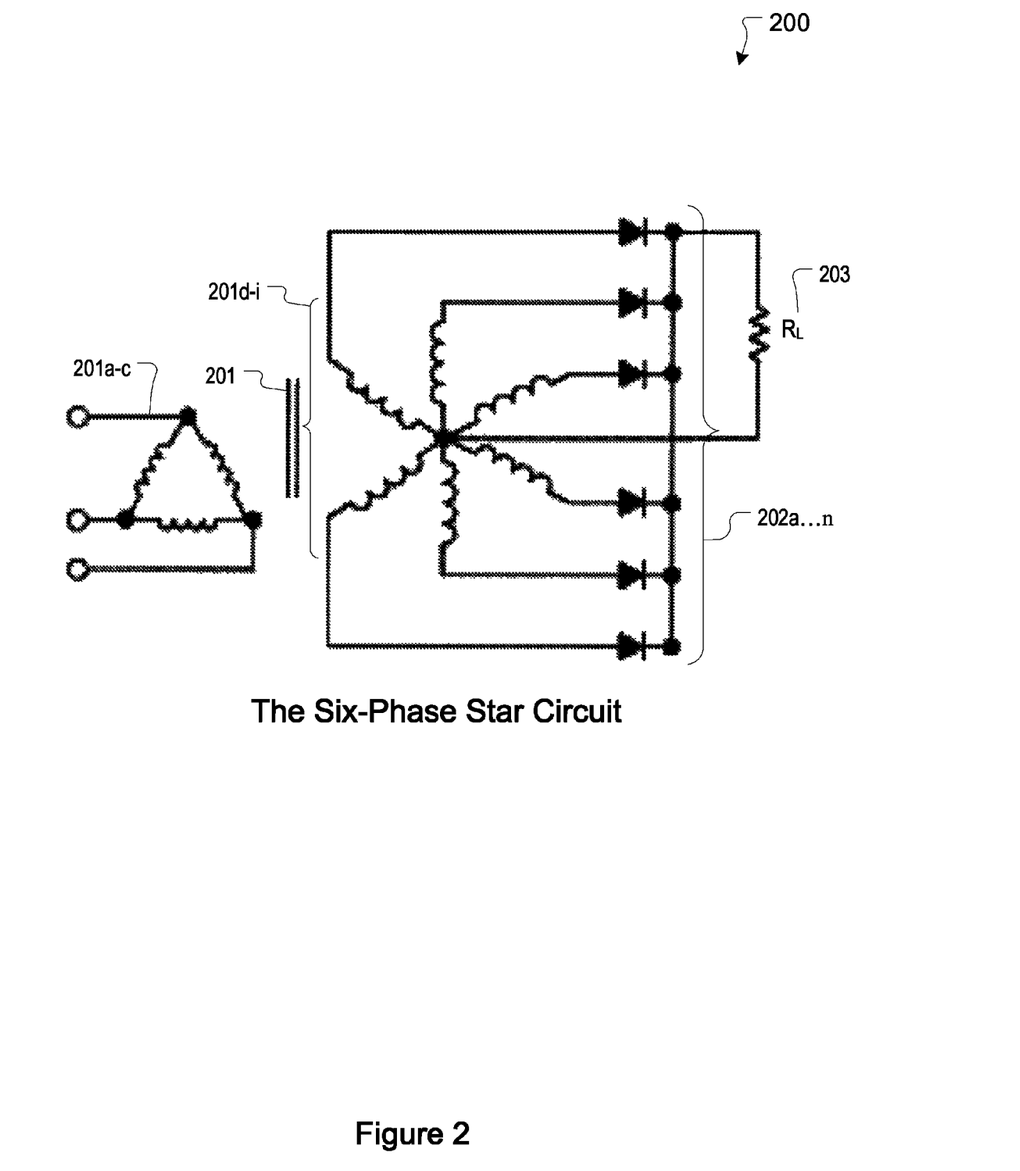
FIG. 2 shows a six-phase star circuit.

FIG. 2 shows another approach to using a static inverter, according to one aspect of the system described herein. In this approach, a six-phase star circuit 200 has, instead of diodes 202*a* . . . *n* shown in the figure, switches to generate the alternating current. The advantage of such an approach is that only one switch is in series, hence reducing conduction losses. However the transformer 201 is more complicated, with additional windings 201*d* . . . *i* on one side (double wye), and a regular delta with three windings 201*a* . . . *c* on the other side (AC).

Figure 3A:
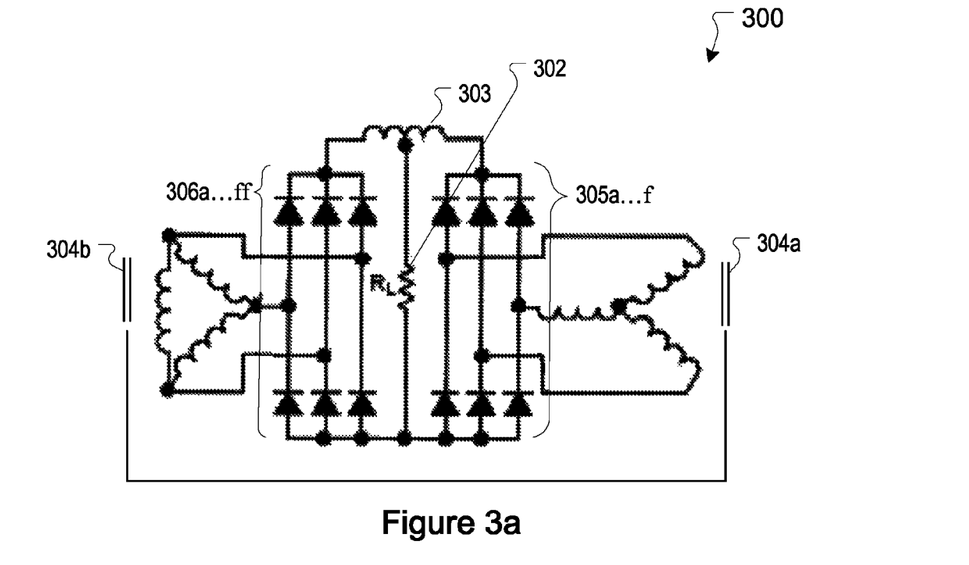
FIG. 3a shows a delta-wye type of transformer.

FIG. 3*a* shows a typical delta (304*b*)-wye (304*a*) type of transformer (ac winding not shown here) in static inverter or rectifier 301. In this example, diodes 305*a* . . . *f* and 306*a* . . . *f* are shown for operation in a rectifying mode, feeding through a balance transformer 303 into a load 302. In other cases, if the load is replaced with a DC bus and the diodes are replaced with switches such as, for example, FETs, SCRs, IGBTs etc, this topology could be used to both rectify or up-convert.

Figure 3B:
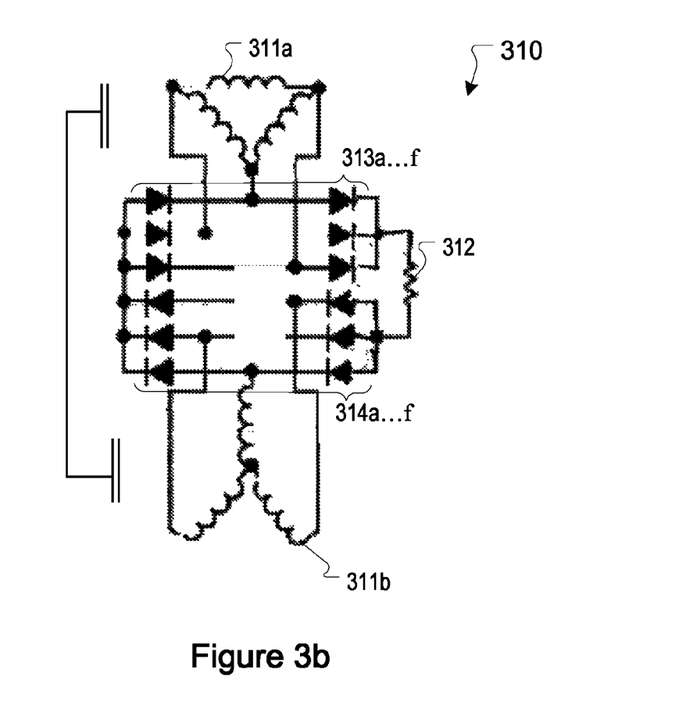
FIG. 3b shows an alternative design of a static inverter or rectifier according to another aspect of the system disclosed herein.

FIG. 3*b* shows an alternative design of static inverter or rectifier 310, according to another aspect of the system disclosed herein. Static inverter or rectifier 310 does not have balancing transformer 303. Shown are delta windings 311*a* and wye windings 311*b*. Also shown are the two sets of switches (as discussed above) or diodes 313*a* . . . *f* and 314*a* . . . *f*. The DC bus or load is resistor RL 312.

Figure 4A:
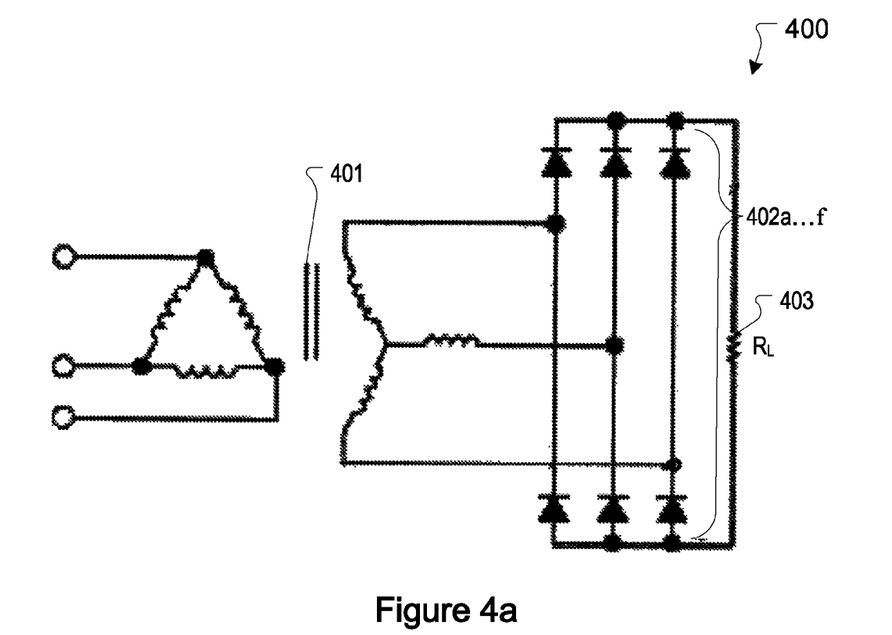
FIG. 4a shows another exemplary simplified static inverter or rectifier in a three-phase full-wave bridge circuit, according to one aspect of the system disclosed herein.

FIG. 4*a* shows another exemplary simplified static inverter or rectifier in three-phase full-wave bridge circuit 400, according to one aspect of the system disclosed herein. Circuit 400 is a 5-pulse type static inverter, characterized by a simpler transformer 401 (only three windings as a delta or wye on the switches side), as opposed to the 12-pulse static inverter or rectifier discussed in other sections that requires a total of six windings (typically as one set of three in a delta and another three in a wye). As a result, circuit 400 has a stronger ripple 411 (than a 12-pulse static inverter or rectifier would have), which can be seen in FIG. 4*b*. Diodes 402*a* . . . *f* are used for rectifiers, or switches would be used for static inverters. Controlled rectifiers or other suitable switches such as MOSFeT, IGBT, or even mercury valves may be used according to the voltage being handled. Also shown is the DC bus or DC load 403.

Figure 4B:
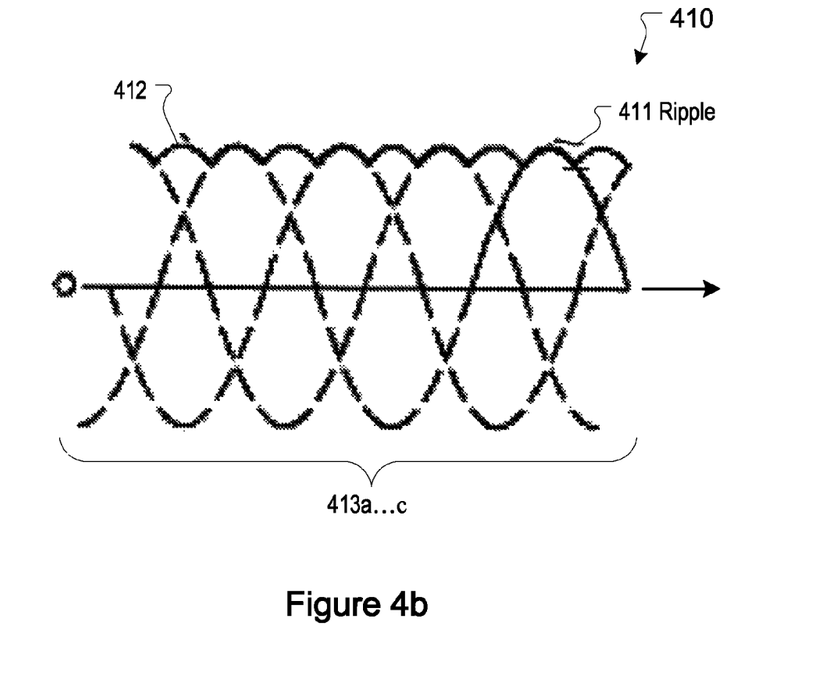
FIG. 4b shows voltage waveforms with output voltage and phase voltages.

FIG. 4*b* shows voltage waveforms 410, with output voltage 412 and phase voltages 413*a* . . . *c*.

Figure 5A:
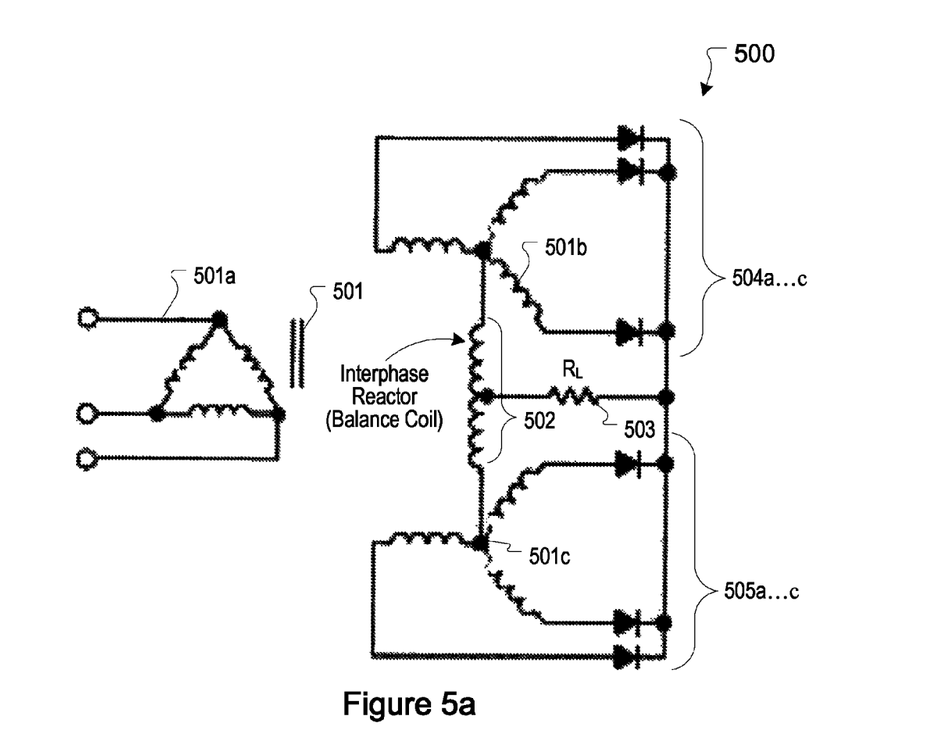
FIG. 5a shows a balanced inter-reactor system with a delta-wye-wye transformer and a balanced reactor on a separate core.

FIG. 5a shows a balanced inter-reactor system 500 with a delta-wye-wye transformer and a balanced reactor on a separate core. Transformer 501 has an AC side delta winding 501a and two primary windings 501b and 501c. Windings 501b and 501c have different winding ratios and/or phase assignments, thus supporting creation of a 12-pulse conversion static inverter or rectifier. Again, instead of standard rectifiers 504a . . . c and 505a . . . c, SCRs or other, suitable switching devices may be used.

Figure 5B:
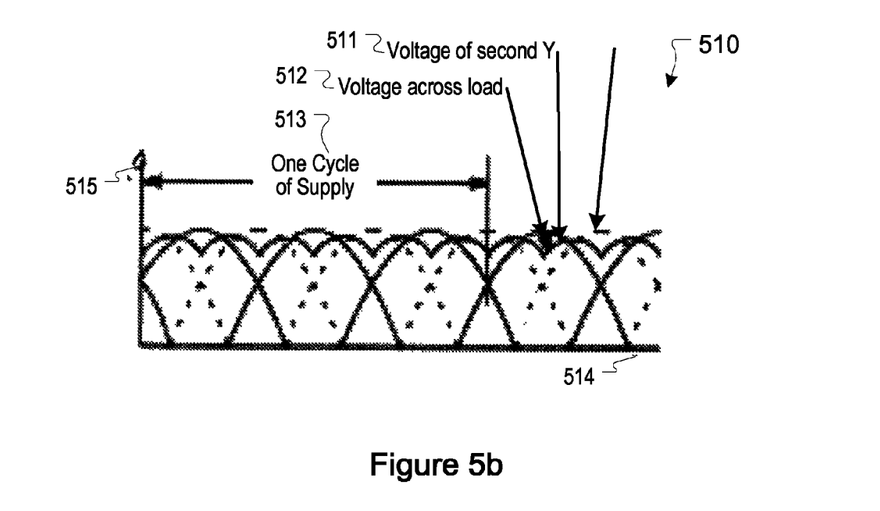
FIG. 5b shows waveforms that result from a 12-pulse approach.

FIG. 5b shows the waveforms 510 that result from a 12-pulse approach, instead of a 6-pulse approach. Voltages are overlaid such that a very small ripple results with less than 3 percent load factor. In many cases, using the 12 pulse approach is sufficient filtering for connection to a grid; however in other cases, additional correction may be required, as discussed below in the description of FIG. 7. Thus when operating from AC to DC, only minimal filter capacity needs to be added, or when operating the other way, minimal power factor correction needs to be done.

Figure 6A:
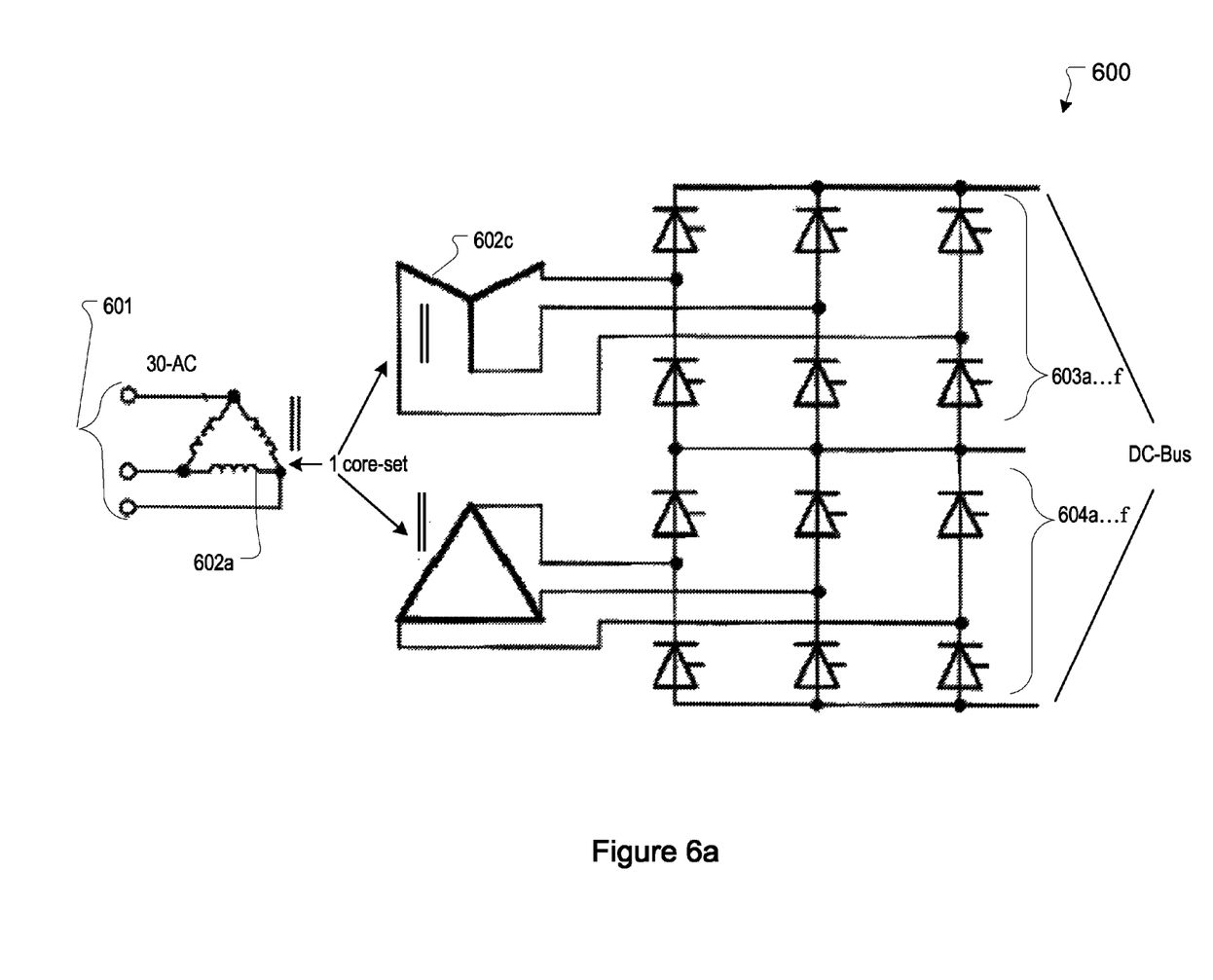
FIG. 6a shows a delta-wye-delta serial configuration of a static inverter.

FIG. 6a shows a delta-wye-delta serial configuration of a static inverter 600 that does not require a balancing transformer. Also, as the two sets of switches are in series, the operating DC voltage can be roughly twice in relation to the breakdown voltage of the switches, as in a parallel configuration. Two sets of diodes or SCRs 603a . . . f and 604a . . . f are in series. As a result, the voltage is split (not evenly, but typically 1:2), resulting in the desired 12-step AC voltage that is commonly known in static inverters. Clearly visible are the AC sides of the transformer 602 with, all on the same core, delta winding 602a, the main winding 602b, also a delta winding, and minor winding 602c, which is a wye winding. Placing the two sets of inverter switches 603a . . . f and 604a . . . f in series obviates the necessity for a balancing transformer. Alternating current is delivered at connection point 601.

Figure 6B:
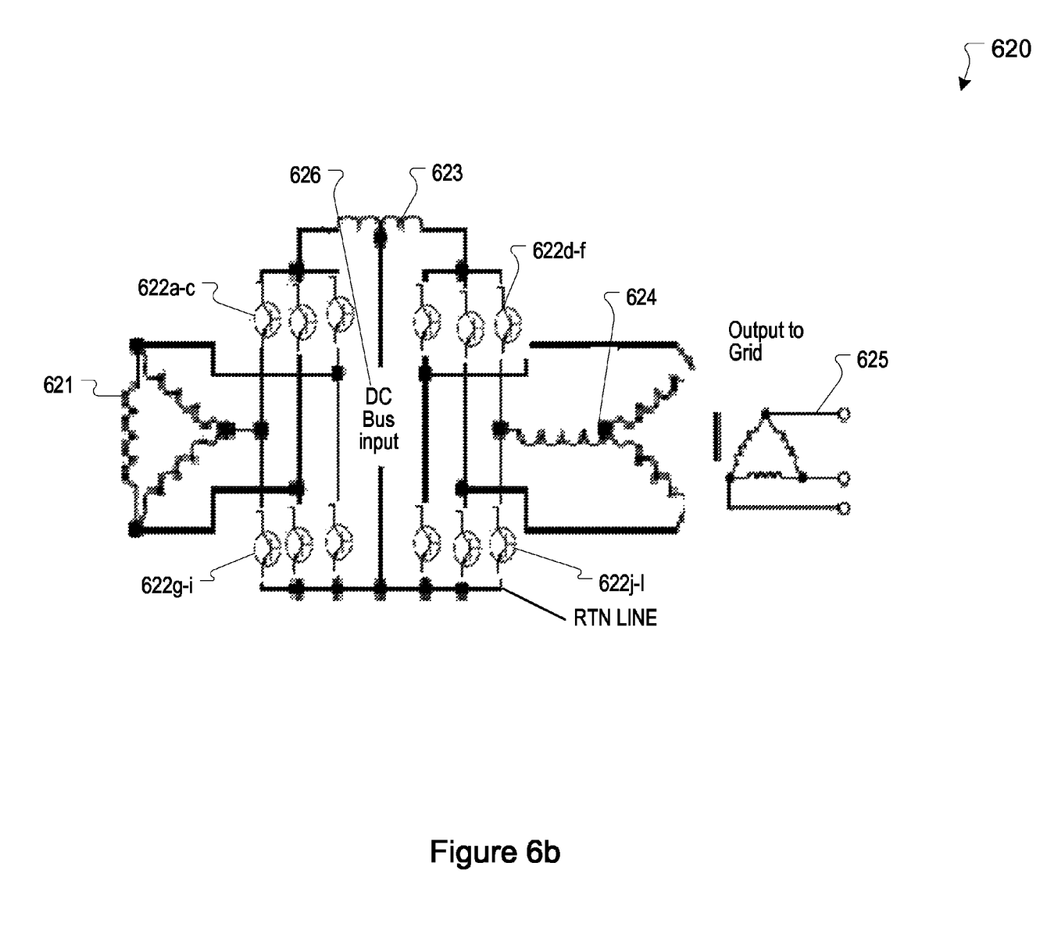
FIG. 6b shows a configuration of a static inverter/rectifier.

FIG. 6b shows an different view of a configuration of a static inverter/rectifier 620. Shown is the DC bus 626, the two DC side windings 621 and 624, as well as AC side windings 625 (all on same core), switches 622a . . . l and balancing transformer 623.

Figure 7:
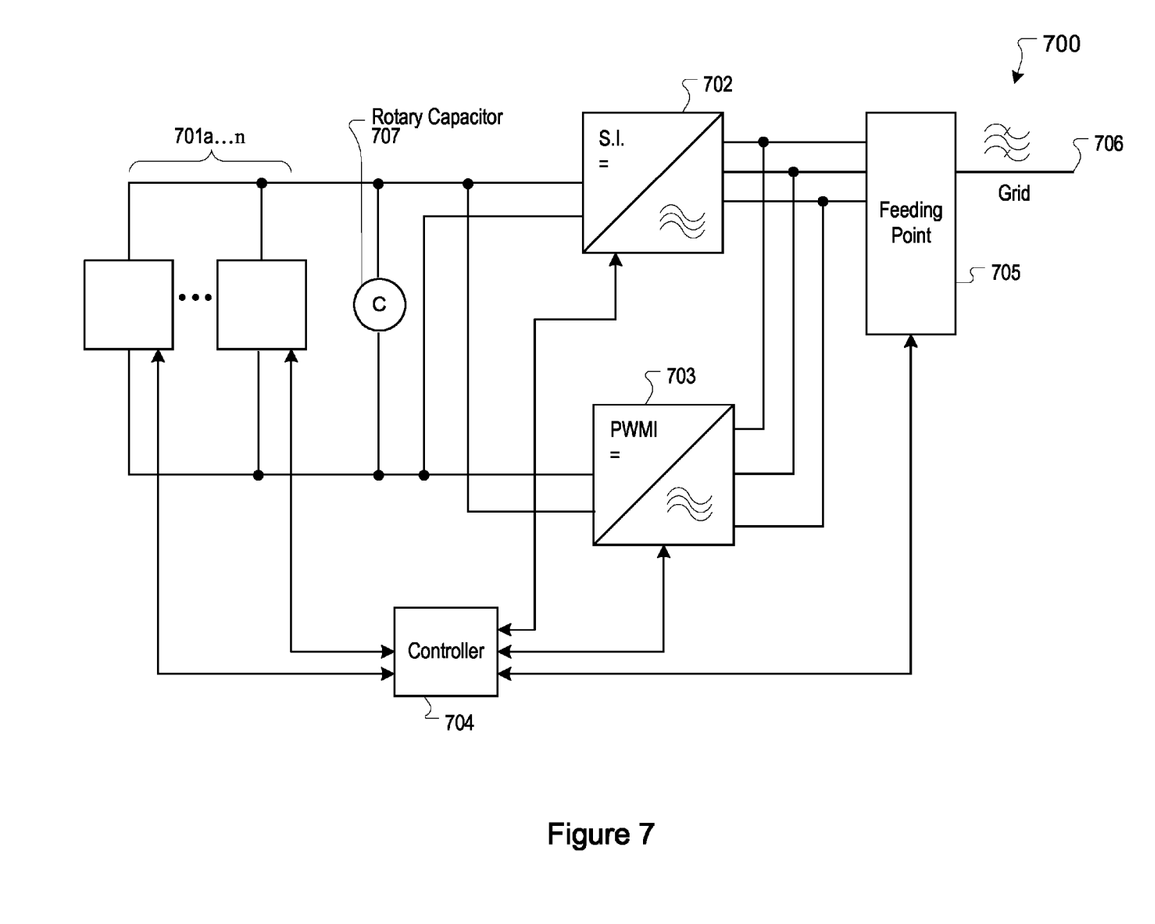
FIG. 7 shows an embodiment of the present invention of a variable energy generation system with a combination of a static inverter and a pulse width modulation inverter.

FIG. 7 shows an exemplary high-level overview of a complete variable DC power generation and AC conversion system 700, according to one aspect of the system disclosed herein. Controller 704 interacts with multiple energy-producing units 701a . . . n such as, for example, a multi-unit solar pole, or a windmill, to maintain the desired voltage on the bus. Also shown is an optional rotary capacitor 707, which in this case may be some kind of a motor with a fly wheel. In such a rotary capacitor, the field current may be used to control addition or reduction of energy and thus to stabilize the bus more efficiently and/or cost effectively in some cases than an actual capacitor, depending on the size of the system. In smaller systems, typically, standard capacitors are used. Static inverter 702 inverts DC energy to three-phase power and connects to feeding point 705, and thence to the grid. An additional pulse width modulation inverter (PWMI) 703 corrects the power factor error generated by the static inverter using the 12-pulse generation method. Also, the additional power with modulation in high-frequency inverter 703 runs on higher frequency as it runs on lower power. In some cases, an additional rotary capacitor or other compensation capacitor may be required at grid connection point 707 before the energy is fed into the grid.

Figure 8:
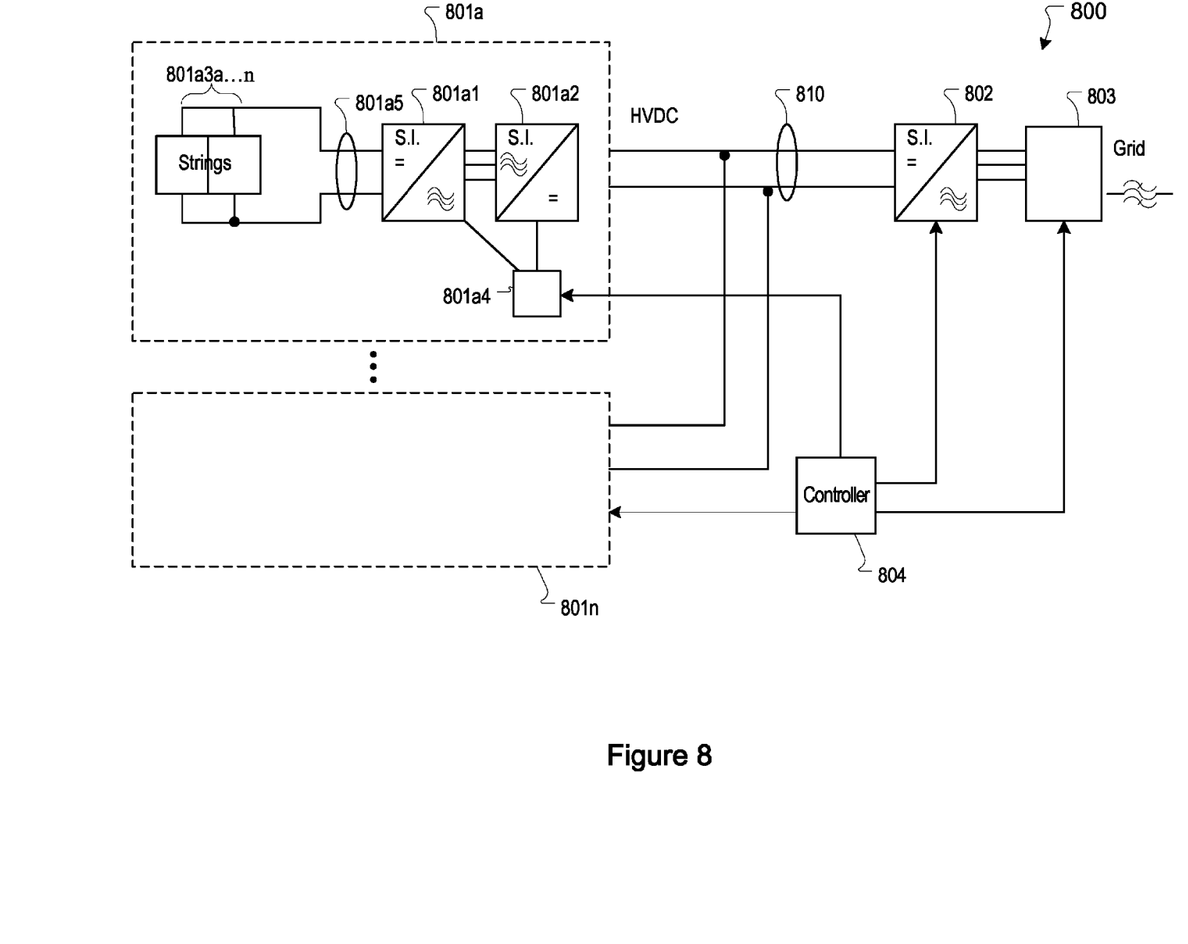
FIG. 8 shows an embodiment of the present invention of a variable energy generation system with multiple static inverters.

FIG. 8 shows a system 800 similar to system 700, wherein each energy production unit, such as, for example, a solar power pole, wind generator, etc. generates a variable, controlled voltage. In exemplary energy production unit 801a, two back-to-back static inverters 801a1 and 801a2 convert the variable DC voltage first into an alternating current, then back into a high-voltage direct current (HVDC), used for a high-voltage transmission line 810. At the end of transmission line 810 an additional static inverter 802 inverts the power into three-phase AC, which is then is then fed into the grid at point 803. Controller 804 interfaces between the grid measurement, the master static inverter 802, and the power generation units at the far end, to balance the voltage on the local DC buses 801a5 that are fed into the internal primary and secondary static inverters 801a1 and 801a2. Additional energy production units 801a . . . n could be, for example, a multi-unit solar pole, or a windmill, or any other variable-power generation unit.

The claims included herein include several embodiments. One embodiment involves collecting energy from variable energy sources such as solar or wind energy, by strings of collectors (for example photovoltaic cells or panels, or wind turbines) as managed by string convertors and controller(s). Then compatible electrical energy is transported on a bus to a static inverter including a transformer (such as a delta-wye-delta transformer) and a balance transformer. The static inverter outputs alternating current at a given voltage. The controller(s) monitor voltage phase on a grid and manages the static inverter so that the alternating current is compatible with grid current.

Another embodiment also involves collecting energy from variable energy sources. In this instance, the topology of the system includes both a static inverter and a pulse width modulation inverter. Current flows through the static inverter and the pulse width inverter to a feeding point and then onto a grid.

Yet another embodiment again involves collecting energy from variable energy sources. Current flows into a static inverter to convert direct current into alternating current. From that point, the alternating current flows into a second static inverter to convert the alternating current into high voltage direct current which is transported on a high voltage direct current transmission line to a master static inverter which in turn converts the direct current into alternating current suitable for transmission via a grid.

While the particular system and apparatus for the use of static inverters in variable energy generation environments as herein shown and described in detail, is fully capable of attaining the above-described objects of the invention, it is to be understood that it is the presently preferred embodiment of the present invention, and is thus representative of the subject matter which is broadly contemplated by the present invention, that the scope of the present invention fully encompasses other embodiments which can become obvious to those skilled in the art, and that the scope of the present invention is accordingly to be limited by nothing other than the appended claims, in which reference to an element in the singular means "at least one." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public, regardless of whether the element or component is explicitly recited in the claims.

It is claimed:

1. A energy generation system, comprising:
one or more strings of variable energy collectors;
one or more string converters managed by a first controller to combine voltage outputs of the one or more strings of variable energy collectors into an energy output stream;
a bus configured to route the energy output stream;
a static inverter to which the bus routes the energy output stream, the static inverter comprising:
switches for converting the electrical energy output to an alternating current; and
a transformer arrangement comprising a transformer and a balancing transformer to convert the alternating current to an alternating current with a given voltage; and
a second controller configured to receive measurements of voltage phase on a grid and control timing of the switches in accordance with the measurements of the voltage phase.

2. The system of claim 1, wherein said transformer arrangement outputs the alternating current with the given voltage.

3. The system of claim 2, wherein the second controller sends data over a network about energy being output.

4. The system of claim 1, wherein the second controller sends data to a supervisory site or receives data from the supervisory site.

5. The system of claim 1, wherein the transformer arrangement is configured to generate three phase alternating current.

6. The system of claim 5, wherein the transformer is a delta-wye-delta transformer.

7. The system of claim 1, wherein the transformer arrangement comprises one or more filters to transform a waveform of the alternating current with the given voltage.

8. The system of claim 1, wherein the second controller communicates with a network to send and receive data over the network regarding operation of the system.

9. The system of claim 1, wherein the second controller includes the first controller.

10. An energy generation system, comprising:
one or more variable energy collecting units producing respective direct current (DC) voltage levels;
a bus;
a first controller in communication with the units to enable the DC voltage levels to be compatible on the bus,
a static inverter to which the bus delivers a DC compatible voltage level, wherein the static inverter converts the DC compatible voltage level to an alternating current;
a pulse width modulation inverter to receive an alternating current output of the static inverter; and
a second controller in communication with the static inverter and the pulse width modulation inverter to control the alternating current output from the static inverter to the pulse width modulation inverter.

11. The system of claim 10, further comprising a capacitor in electrical communication with the bus.

12. The system of claim 10, wherein a modified alternating current flow is output from the pulse width modulation inverter to a feeding point.

13. The system of claim 10, wherein the second controller includes the first controller.

14. A energy generation system, comprising:
one or more variable energy collecting units to produce direct current (DC);
a bus;
a controller in communication with the units to maintain a desired voltage on the bus;
a first static inverter to which the bus delivers the DC, wherein the first static inverter converts the DC received from the bus to an alternating current; and
a second static inverter configured to receive the alternating current provided by the first static inverter and convert the alternating current received from first static inverter to a high voltage direct current.

15. The system of claim 14, further comprising a filter to modify a waveform of the alternating current.

16. The system of claim 14, further comprising a master static inverter receiving an output of the high voltage direct current to generate an alternating current for a power grid.

17. The system of claim 14, wherein the controller is in communication with a grid.

18. The system of claim 14, further comprising:
a high voltage direct current transmission line configured to receive the high voltage direct current generated at least by the second static inverter; and
a third static inverter configured to convert from a high voltage direct current received from the high voltage direct current transmission line to an alternating current at a feeding point.

19. The system of claim 18, further comprising:
a fourth static inverter configured to convert from a direct current input to an alternating current output; and
a fifth static inverter configured to convert the alternating current output of the fourth static inverter to a high voltage direct current output to the high voltage direct current transmission line.

20. The system of claim 19, wherein the fifth static inverter and the second static inverter power the high voltage direct current transmission line in parallel.

* * * * *